United States Patent
Nguyen et al.

(10) Patent No.: US 9,840,655 B2
(45) Date of Patent: Dec. 12, 2017

(54) COMPOSITIONS AND METHODS FOR FORMING AND UTILIZING STABLE, SINGLE-COMPONENT RESIN MIXTURE

(71) Applicant: Halliburton Energy Services, Inc., Houston, TX (US)

(72) Inventors: Philip D. Nguyen, Houston, TX (US); Loan K. Vo, Houston, TX (US); James William Ogle, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/916,934

(22) PCT Filed: Sep. 20, 2013

(86) PCT No.: PCT/US2013/060893
§ 371 (c)(1),
(2) Date: Mar. 4, 2016

(87) PCT Pub. No.: WO2015/041673
PCT Pub. Date: Mar. 26, 2015

(65) Prior Publication Data
US 2016/0200960 A1    Jul. 14, 2016

(51) Int. Cl.
*C09K 8/512* (2006.01)
*C09K 8/575* (2006.01)
(Continued)

(52) U.S. Cl.
CPC ............ *C09K 8/575* (2013.01); *C09K 8/5751* (2013.01); *C09K 8/805* (2013.01); *E21B 43/025* (2013.01)

(58) Field of Classification Search
CPC .................................................. E21B 33/138
See application file for complete search history.

(56) References Cited

U.S. PATENT DOCUMENTS 3,759,327 A * 9/1973 Carnes ................. C09K 8/565
166/295
4,669,543 A * 6/1987 Young ................. C09K 8/5755
166/276

(Continued)

FOREIGN PATENT DOCUMENTS

| WO | 2009/063165 | 5/2009 |
| WO | 2009/078745 | 6/2009 |
| WO | 2015/041673 | 3/2015 |

OTHER PUBLICATIONS

Maniar et al. Determination of Specific Rate Constants of Specific Oligomers during Polyester Hydrolysis—1990.*

(Continued)

*Primary Examiner* — Doug Hutton, Jr.
*Assistant Examiner* — Avi Skaist
(74) *Attorney, Agent, or Firm* — Craig W. Roddy; Tumey L.L.P.

(57) ABSTRACT

A method of treating a subterranean formation including providing a treatment fluid comprising a hardenable acid curable resin and a hydrolysable dimer acid ester. The treatment fluid is combined with a carrier fluid and is introduced into a subterranean formation. Upon the hydrolyzing of the ester in the formation and the contacting of unconsolidated proppants, the treatment method produces consolidated proppants.

25 Claims, 1 Drawing Sheet

(51) Int. Cl.
  *C09K 8/80* (2006.01)
  *E21B 43/02* (2006.01)

(56) References Cited

U.S. PATENT DOCUMENTS

| | | | | |
|---|---|---|---|---|
| 4,938,287 | A | * | 7/1990 | Friedman ............ C09K 8/5753 166/288 |
| 5,377,759 | A | * | 1/1995 | Surles ................. C09K 8/5755 166/295 |
| 6,705,400 | B1 | | 3/2004 | Nguyen et al. |
| 6,729,404 | B2 | | 5/2004 | Nguyen et al. |
| 6,962,200 | B2 | | 11/2005 | Nguyen et al. |
| 7,114,570 | B2 | | 10/2006 | Nguyen et al. |
| 7,264,052 | B2 | | 9/2007 | Nguyen et al. |
| 7,306,037 | B2 | * | 12/2007 | Nguyen ................ E21B 43/025 166/295 |
| 2003/0230408 | A1 | | 12/2003 | Acock et al. |
| 2005/0194136 | A1 | | 9/2005 | Nguyen et al. |
| 2007/0187097 | A1 | | 8/2007 | Weaver et al. |
| 2013/0233551 | A1 | | 9/2013 | Lin et al. |

OTHER PUBLICATIONS

Ball et al. Introduction to Chemistry—Chapter 15—2012.*
Ball, David W., et al., "Organic Acids and Bases and Some of Their Derivatives," The Basics of General, Organic, and Biological Chemistry, Mar. 2011, pp. 789; 834-838; 884-885, v. 1.0.
U.S. Non-Final Office Action, dated Mar. 2, 2017, U.S. Appl No. 14/888,438, "Latent Curing Agent Compatible with Low pH Frac Fluids," filed Nov. 1, 2015.

* cited by examiner

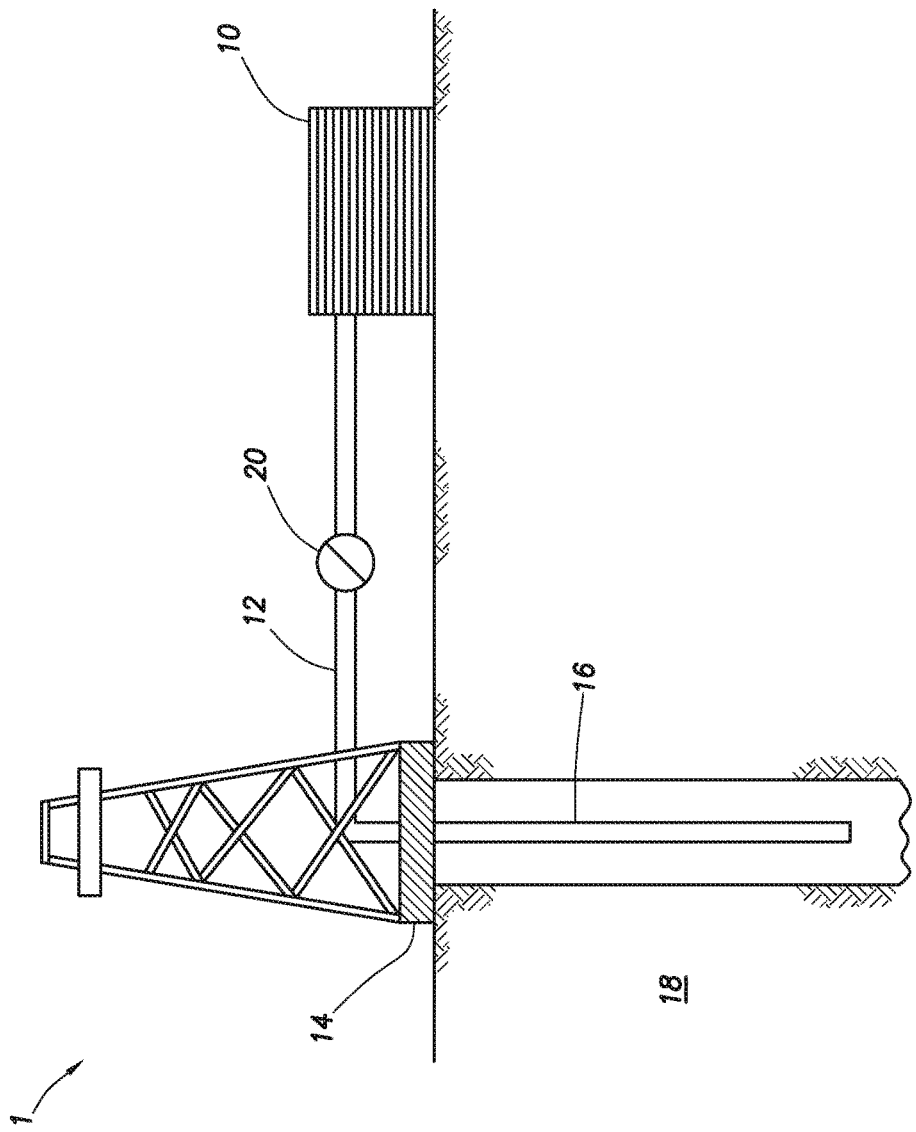

COMPOSITIONS AND METHODS FOR FORMING AND UTILIZING STABLE, SINGLE-COMPONENT RESIN MIXTURE

BACKGROUND

The present invention generally relates to the use of curable resin treatment fluids in subterranean operations, and, more specifically, to the use of hardenable acid curable resin treatment fluids comprising hardenable acid curable resin compounds and acid esters, and methods of using these treatment fluids in subterranean operations.

Many petroleum-containing formations also contain unconsolidated granular mineral material such as sand or gravel. After completion, production of fluids from the formation causes the flow of the particulate matter into the wellbore, which often leads to any of several difficult and expensive problems. Unconsolidated subterranean zones include those which contain loose particulates that are readily entrained by produced fluids and those wherein the particulates making up the zone are bonded together with insufficient bond strength to withstand the forces produced by the production of fluids through the zone. Sometimes a well is said to "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well.

Conventional treatment methods involve treating the porous, unconsolidated mass sand around the wellbore in order to cement the loose sand grains together, thereby forming a permeable consolidated sand mass which will allow production of fluids but which will restrain the movement of sand particles into the wellbore. These procedures create a permeable barrier or sieve adjacent to the perforations or other openings in the well casing which establish communication between the production formation and the production tubing, which restrains the flow of loose particulate mineral matter such as sand.

Oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. To accomplish this, a viscous fracturing fluid may pumped down the casing to the formation at a rate and a pressure sufficient to form fractures that extend into the formation, providing additional pathways through which the oil or gas can flow to the well. A proppant is a solid material, typically treated sand or man-made ceramic materials, designed to keep an induced hydraulic fracture open, during or following a fracturing treatment. It is added to the fracturing fluid. After the fracturing procedure has been completed, it may be desirable to consolidate the proppant materials.

Typical sand consolidation treatments use plastic resins, and are not entirely satisfactory. Resins tend to reduce the permeability of the consolidated formation below acceptable levels. In addition, resins are relatively costly on a unit volume basis and can be operationally very difficult to properly place in the formation. Certain resins, such as furan based resins, require a high temperature to initiate the curing of the resin. Additionally, when acids are mixed with furan-based resins, a rapid, exothermic reaction may occur. Typically, resins must separate from the catalysts until the moment they are used in the wellbore treatment, thereby creating a two-part system. The acids may further cause a degradation of the fluid viscosity.

Accordingly, an ongoing need exists for catalysts that may be added to and stored with resins without concern of rapid and exothermic reactions, and catalysts that can cure the resins at low temperatures when placed downhole for consolidating sand and other proppant particles in subterranean formations.

BRIEF DESCRIPTION OF THE DRAWINGS

The following FIGURE is included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

FIG. 1 depicts an embodiment of a system configured for delivering the consolidating agent composition comprising treatment fluids of the embodiments described herein to a downhole location.

DETAILED DESCRIPTION

In some embodiments of the present invention, a method of treating a wellbore in a subterranean formation includes providing a first fluid comprising a hardenable acid curable resin and a hydrolysable dimer acid ester capable of generating a dimerized fatty acid when exposed to water; providing a carrier fluid; placing a first stream comprising the first fluid and the carrier fluid into a zone in the subterranean formation, said zone comprising unconsolidated particulates; and forming consolidated particulates upon the contacting of the unconsolidated particles with the reaction product of the hardenable acid curable resin, hydrolysable acid ester and water in the formation.

In various embodiments, the hydrolyzable ester capable of producing dimerized fatty acid is soluble in the epoxy resin, but remains inert so that a homogeneous mixture can be premixed and stored. However, the curing process of this resin mixture is begun once the ester is exposed to water, allowing the dimerized fatty acid to be generated by hydrolysis and react. Instead of storing the curable resin and hardening agent separately as commonly required for two component epoxy resins, the method described herein allows both components to be stored as a single mixture, and only activated when the hydrolyzable ester component is exposed to water to release the hardening agent, for example, as part of hydraulic fracturing treatment, remedial consolidation treatments for near-wellbore formations, aqueous pre-flush and/or post-flush fluid as part of formation treatment, or for proppant placed in propped fractures.

In many embodiments, the advantages of the single component system include: treating proppant or formation sand as a single component without requiring mixing of individual components, minimizing potential errors of mixing the wrong ratio at the wellsite; the ability to handle a wide range of temperatures, e.g. 70 to 375° F.; the ability to control the cure kinetics to achieve consolidation when needed; and the ability to retain tackiness of the coated surface even after obtaining consolidation of the proppant pack.

In certain embodiments of the present invention, a method of treating a subterranean formation comprises placing a first stream comprising a hardenable acid curing resin and a hydrolysable acid ester capable of generating a dimerized fatty acid when exposed to water into a wellbore in a subterranean formation, said formation comprising unconsolidated particulates; and forming consolidated particulates upon the contacting of the unconsolidated particles with the reaction product of the hardenable acid curing resin, hydrolysable acid ester and water in the formation.

Some embodiments of the present invention provide a method for treating a well including providing a wellbore in a subterranean formation; providing a first fluid comprising a hardenable acid curing resin and a hydrolysable acid ester capable of generating a dimerized fatty acid; providing proppant particulates; coating the proppant particulates with the first fluid; providing a second stream comprising an aqueous base fluid; creating at least one fracture in said subterranean formation; placing a first stream comprising the coated proppant particulates and the second stream into the subterranean and into at least one fracture therein; wherein the proppant particulates form a proppant pack in the at least one fracture; and forming consolidated proppant particulates upon the curing of the coated proppant particulates in the proppant pack upon hydrolyzing of at least a portion of said dimer acid ester.

Another embodiment of the invention includes a well treatment system including a well treatment apparatus configured to: form or provide a first stream comprising a hardenable acid curing resin and a hydrolysable acid ester capable of generating a dimerized fatty acid when exposed to water; place the first stream into a zone in a subterranean formation, said zone comprising unconsolidated particulates; and form consolidated particulates upon the contacting of the unconsolidated particles with the reaction product of the hardenable acid curable resin, hydrolysable acid ester and water in the formation, and curing of the coated resin product.

In one embodiment, a method of treating a wellbore in a subterranean formation includes providing a first fluid comprising a hardenable acid curable resin and a hydrolysable dimer acid ester capable of generating a dimerized fatty acid when exposed to water; providing a carrier fluid; placing a first stream comprising the first fluid and the carrier fluid into a zone in the subterranean formation, said zone comprising unconsolidated particulates; and forming consolidated particulates upon the contacting of the unconsolidated particles with the reaction product of the hardenable acid curable resin, hydrolysable dimer acid ester and water in the formation. In certain embodiments, the forming includes reacting the hardenable acid curable resin, hydrolysable dimer acid ester, and water in the formation, thereby forming a reaction product. In some embodiments, the reaction product comprises a dimerized fatty acid incorporated into the backbone of the polyester polymer of the hardenable acid curable resin. In exemplary embodiments, the hardenable acid curable resin is a bisphenol A epoxy resin. In further embodiments, the reaction product is cured to the unconsolidated particulates. In some embodiments, the hardenable acid curable resin includes at least one member selected from the group consisting of bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resin, urea-aldehyde resins, furan resins, urethane resins, a glycidyl ether resins, other epoxide resins, and combinations thereof. In an exemplary embodiment, the resin is a urethane resin. In certain embodiments, the hardenable acid curable resin is present in the amount of about 0.1% to about 10% by weight of the treatment fluid. In some embodiments, the hydrolysable dimer acid ester comprises at least one member selected from the group consisting of polyacids, synthetic acids produced from fatty acids, maleic anhydride, acrylic acid; and any combination thereof. In other embodiments, the polyacid comprises $C_{36}$ dibasic acids including at least one of dimer oligomers, trimer oligomers, tetramer oligomers, pentamer oligomers, hexamer oligomers, heptamer oligomers, octamer oligomers, nonamer oligomers, decamer oligomers, higher oligomers, monomer acids, and any combination thereof. In certain embodiments, the hydrolysable dimer acid ester is present in the amount of about 0.1% to about 10% by weight of the treatment fluid. In an embodiment, the hydrolysable dimer acid ester is encapsulated in a hydrolysable material. In certain embodiment, the carrier fluid comprises a non-aqueous base fluid. In further embodiments, at least one of the hardenable acid curable resin and the hydrolysable dimer acid ester is soluble in the carrier fluid. In some embodiments, the first stream may include a silane coupling agent. In exemplary embodiments, the silane coupling agent includes at least one member selected from the group consisting of N-2-(aminoethyl)-3-aminopropyltrimethoxysilane; 3-glycidoxypropyltrimethoxysilane; n-beta-(aminoethyl)-gamma-aminopropyl trimethoxysilane; and combinations thereof. In certain embodiments, the coupling agent is present in the amount of about 0.01% to about 2% by weight of the treatment fluid. In several embodiments, the first stream further comprises a catalyst, wherein the catalyst comprises at least one member selected from organic amine bases, inorganic bases, and mixtures thereof. In exemplary embodiments, the organic amine base is selected from the following group consisting of pyridine, isoquinoline, quinoline, N,Ndimethylcyclohexylamine, tributylamine, tripropylamie, N-ethylmorpholine, dimethylaniline, and mixtures thereof. In other embodiments, the inorganic base is selected from the following group consisting of potassium hydroxide, sodium hydroxide, ammonium hydroxide, and mixtures thereof. In certain embodiments, the catalyst is present in the amount of about 0.01% to about 5% by weight of the treatment fluid. In some embodiments, the first stream further comprises a surfactant for facilitating the contacting of the unconsolidated particulates with the reaction product. In exemplary embodiments, the surfactant comprises at least one member selected from the group consisting of an ethoxylated nonyl phenol phosphate ester; mixtures of one or more cationic surfactants; a $C_{12}$-$C_{22}$ alkyl phosphonate surfactant; a mixture of one or more non-ionic surfactants; an alkyl phosphonate surfactant; and mixtures thereof. In certain embodiments, the surfactant is present in the amount of about 0.01% to about 5% by weight of the treatment fluid.

Some embodiments of the present invention provide a method for treating a well including providing a wellbore in a subterranean formation; providing a first fluid comprising a hardenable acid curing resin and a hydrolysable acid ester capable of generating a dimerized fatty acid; providing proppant particulates; coating the proppant particulates with the first fluid; providing a second stream comprising an aqueous base fluid; creating at least one fracture in said subterranean formation; placing a first stream comprising the coated proppant particulates and the second stream into the subterranean and into at least one fracture therein;

wherein the proppant particulates form a proppant pack in the at least one fracture; and forming consolidated proppant particulates upon the curing of the coated proppant particulates in the proppant pack upon hydrolyzing of at least a portion of said dimer acid ester. In certain embodiments, the forming includes reacting the hardenable acid curable resin, hydrolysable dimer acid ester, and water in the formation, thereby forming a reaction product. In some embodiments, the reaction product comprises a dimerized fatty acid incorporated into the backbone of the polyester polymer of the hardenable acid curable resin. In exemplary embodiments, the hardenable acid curable resin is a bisphenol A epoxy resin. In further embodiments, the reaction product is cured to the unconsolidated particulates. In some embodiments, the hardenable acid curable resin includes at least one member selected from the group consisting of bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resin, urea-aldehyde resins, furan resins, urethane resins, a glycidyl ether resins, other epoxide resins, and combinations thereof. In an exemplary embodiment, the resin is a urethane resin. In certain embodiments, the hardenable acid curable resin is present in the amount of about 0.1% to about 45% by weight of the treatment fluid. In some embodiments, the hydrolysable dimer acid ester comprises at least one member selected from the group consisting of polyacids, synthetic acids produced from fatty acids, maleic anhydride, acrylic acid; and any combination thereof. In other embodiments, the polyacid comprises $C_{36}$ dibasic acids including at least one of dimer oligomers, trimer oligomers, tetramer oligomers, pentamer oligemers, hexamer oligomers, heptamer oligomers, octamer oligomers, nonamer oligomers, decamer oligomers, higher oligomers, monomer acids, and any combination thereof. In certain embodiments, the hydrolysable dimer acid ester is present in the amount of about 0.1% to about 45% by weight of the carrier fluid. In an embodiment, the hydrolysable dimer acid ester is encapsulated in a hydrolysable material. In certain embodiment, the carrier fluid comprises a non-aqueous base fluid. In further embodiments, at least one of the hardenable acid curable resin and the hydrolysable dimer acid ester is soluble in the carrier fluid. In some embodiments, the first stream may include a silane coupling agent. In exemplary embodiments, the silane coupling agent includes at least one member selected from the group consisting of N-2-(aminoethyl)-3-aminopropyltrimethoxysilane; 3-glycidoxypropyltrimethoxysilane; n-beta-(aminoethyl)-gamma-aminopropyl trimethoxysilane; and combinations thereof. In certain embodiments, the coupling agent is present in the amount of about 0.01% to about 2% by weight of the carrier fluid. In several embodiments, the first stream further comprises a catalyst, wherein the catalyst comprises at least one member selected from organic amine bases, inorganic bases, and mixtures thereof. In exemplary embodiments, the organic amine base is selected from the following group consisting of pyridine, isoquinoline, quinoline, N,Ndimethylcyclohexylamine, tributylamine, tripropylamie, N-ethylmorpholine, dimethylaniline, and mixtures thereof. In other embodiments, the inorganic base is selected from the following group consisting of potassium hydroxide, sodium hydroxide, ammonium hydroxide, and mixtures thereof. In certain embodiments, the catalyst is present in the amount of about 0.01% to about 5% by weight of the carrier fluid. In some embodiments, the first stream further comprises a surfactant for facilitating the contacting of the unconsolidated particulates with the reaction product. In exemplary embodiments, the surfactant comprises at least one member selected from the group consisting of an ethoxylated nonyl phenol phosphate ester; mixtures of one or more cationic surfactants; a $C_{12}$-$C_{22}$ alkyl phosphonate surfactant; a mixture of one or more non-ionic surfactants; an alkyl phosphonate surfactant; and mixtures thereof. In certain embodiments, the surfactant is present in the amount of about 0.01% to about 5% by weight of the carrier fluid.

Another embodiment of the invention includes a well treatment system including a well treatment apparatus configured to: form or provide a first stream comprising a hardenable acid curing resin and a hydrolysable acid ester capable of generating a dimerized fatty acid when exposed to water; place the first stream into a zone in a subterranean formation, said zone comprising unconsolidated particulates; and form consolidated particulates upon the contacting of the unconsolidated particles with the reaction product of the hardenable acid curable resin, hydrolysable acid ester and water in the formation. In certain embodiments, the forming includes reacting the hardenable acid curable resin, hydrolysable dimer acid ester, and water in the formation, thereby forming a reaction product. In some embodiments, the reaction product comprises a dimerized fatty acid incorporated into the backbone of the polyester polymer of the hardenable acid curable resin. In exemplary embodiments, the hardenable acid curable resin is a bisphenol A epoxy resin. In further embodiments, the reaction product is cured to the unconsolidated particulates. In some embodiments, the hardenable acid curable resin includes at least one member selected from the group consisting of bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resin, urea-aldehyde resins, furan resins, urethane resins, a glycidyl ether resins, other epoxide resins, and combinations thereof. In an exemplary embodiment, the resin is a urethane resin. In certain embodiments, the hardenable acid curable resin is present in the amount of about 0.1% to about 10% by weight of the treatment fluid. In some embodiments, the hydrolysable dimer acid ester comprises at least one member selected from the group consisting of polyacids, synthetic acids produced from fatty acids, maleic anhydride, acrylic acid; and any combination thereof. In other embodiments, the polyacid comprises $C_{36}$ dibasic acids including at least one of dimer oligomers, trimer oligomers, higher oligomers monomer acids, and any combination thereof. In certain embodiments, the hydrolysable dimer acid ester is present in the amount of about 0.1% to about 10% by weight of the treatment fluid. In an embodiment, the hydrolysable dimer acid ester is encapsulated in a hydrolysable material. In certain embodiment, the carrier fluid comprises a non-aqueous base fluid. In further embodiments, at least one of the hardenable acid curable resin and the hydrolysable dimer acid ester is soluble in the carrier fluid. In some embodiments, the first stream may include a silane coupling agent. In exemplary embodiments, the silane coupling agent includes at least one member selected from the group consisting of N-2-(aminoethyl)-3-aminopropyltrimethoxysilane; 3-glycidoxypropyltrimethoxysilane; n-beta-(aminoethyl)-gamma-aminopropyl trimethoxysilane; and combinations thereof. In certain embodiments, the coupling agent is present in the amount of about 0.01% to about 2% by weight of the treatment fluid. In several embodiments, the first stream further comprises a catalyst, wherein the catalyst comprises at least one member selected from organic amine bases, inorganic bases, and mixtures thereof. In exemplary embodiments, the organic amine base is selected from the following group consisting of pyridine, isoquinoline, quinoline, N,Ndimethylcyclohexylamine, tributylamine, tripropylamie, N-ethylmorpholine, dimethylaniline, and mixtures thereof. In other embodiments, the inorganic base is selected from the following group consisting of potassium hydroxide, sodium hydroxide, ammonium hydroxide, and mixtures thereof. In certain embodiments, the catalyst is present in the amount of about 0.01% to about 5% by weight of the treatment fluid. In some embodiments, the first stream further comprises a surfactant for facilitating the contacting of the unconsolidated particulates with the reaction product. In exemplary embodiments, the surfactant comprises at least one member selected from the group consisting of an ethoxylated nonyl phenol phosphate ester; mixtures of one or more cationic surfactants; a $C_{12}$-$C_{22}$ alkyl phosphonate surfactant; a mixture of one or more non-ionic surfactants; an alkyl phosphonate surfactant; and mixtures thereof. In certain embodiments, the surfactant is present in the amount of about 0.01% to about 5% by weight of the treatment fluid.

One of the advantages of some embodiments of the present invention is the ability to tailor the rate of the crosslinking reaction by the addition of one or more polymerization rate retarders. Other advantages may be evident to one skilled in the art.

In certain embodiments, before the reaction occurs, the treatment fluids of the present invention may comprise a carrier fluid; a hardenable acid curing resin, and a hydrolysable dimer acid ester. After the hydrolysis of the dimer acid ester occurs, a treatment fluid in accordance with the present invention may comprise a carrier fluid and a reaction product of a hardenable acid curing resin and a dimer acid. The reaction may initiate before contacting the proppant particles, or after the particles have been contacted.

Carrier Fluids

In some embodiments, carrier fluids are used to deliver the hardenable acid curing resin and hydrolysable strong acid ester into a wellbore. Typically, at least one of the hardenable acid curable resin and the hydrolysable strong acid ester is soluble in the carrier fluid. In certain embodiments, the carrier fluid comprises a non-aqueous base fluid. Suitable examples of solvents may include, but are not limited to, an alcohol (e.g., isopropyl alcohol, methanol, butanol, and the like); a glycol (e.g., ethylene glycol, propylene glycol, and the like); a glycol ether (e.g., ethyleneglycol monomethyl ether, ethylene glycol monobutylether, and the like); a polyether (e.g., polypropylene glycol); and any combination thereof.

Aqueous Base Fluids

The aqueous base fluid of the present embodiments can generally be from any source, provided that the fluids do not contain components that might adversely affect the stability and/or performance of the treatment fluids of the present invention. In various embodiments, the aqueous carrier fluid can comprise fresh water, salt water, seawater, brine, or an aqueous salt solution. In some embodiments, the aqueous carrier fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some embodiments, the aqueous carrier fluid can be a high density brine. As used herein, the term "high density brine" refers to a brine that has a density of about 10 lbs/gal or greater (1.2 $g/cm^3$ or greater).

In some embodiments, the aqueous carrier fluid is present in the treatment fluid the amount of from about 85% to about 98% by volume of the treatment fluid. In another embodiment, the aqueous carrier fluid is present in the amount of from about 90% to about 98% by volume of the treatment fluid. In further embodiments, the aqueous carrier fluid is present in the amount of from about 94% to about 98% by volume of the treatment fluid. When the solubility of the polyvalent metal salt of carboxylic acid, the water-soluble polymerization initiator, or other components that may be added to the fluids described herein are low, a solvent may optionally be included with the aqueous base fluid so as to aid in solubility and/or polymerization and curing of the polyvalent metal salt of carboxylic acid. Suitable examples of solvents may include, but are not limited to, an alcohol (e.g., isopropyl alcohol, methanol, butanol, and the like); a glycol (e.g., ethylene glycol, propylene glycol, and the like); a glycol ether (e.g., ethyleneglycol monomethyl ether, ethylene glycol monobutylether, and the like); a polyether (e.g., polypropylene glycol); and any combination thereof. For purposes of this disclosure, a material is considered as water-soluble if the solubility of the material in water at room temperature is 5% or higher.

Hardenable Acid Curable Resins

Treatment fluids of the present invention comprise a hardenable acid curable resin. In some embodiments, the resin comprises at least one member selected from the group consisting of bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resin, urea-aldehyde resins, furan resins, urethane resins, a glycidyl ether resins, other epoxy resins, and combinations thereof. In an exemplary embodiment, the resin is a urethane resin.

In various embodiments, an amount of the hardenable acid curable resin present in the treatment fluids is from about 1 wt. % to about 30 wt. %, alternatively, about 5 wt. % to about 20 wt. % alternatively about 10 wt. % to about 15 wt. % based on weight of carrier fluid used in the treatment fluid.

Hydrolysable Dimer Acid Esters

The treatment fluids of the present invention also include hydrolysable dimer acid esters. Upon hydrolyzing, the dimer acid ester yields a dimerized fatty acid. Dimerized fatty acids have non-crystallinity due to their extremely hydrophobic characteristics. The dimerized fatty acid may be incorporated into a hardenable acid curable resin. In some embodiments, this resin is a polyepoxy resin. In an exemplary embodiment, by incorporating a dimerized fatty acid into the backbone of the polyester polymer with bisphenol A, the new resin exhibits not only great compressive strength, but also elasticity and tackiness.

Non-limiting examples of hydrolysable dimer acid esters include at least one member selected from the group consisting of polyacids, synthetic acids produced from fatty acids, maleic anhydride, acrylic acid; and any combination thereof. In other embodiments, the polyacid comprises $C_{36}$ dibasic acids including at least one of dimer oligomers, trimer oligomers, tetramer oligomers, pentamer oligerners, hexamer oligomers, heptarner oligomers, octamer oligomers, nonarner oligomers, decamer oligomers, higher oligomers, monomer acids, and any combination thereof.

In some embodiments, hydrolysable dimer acid ester is encapsulated in a hydrolysable material. In certain embodiments, the encapsulated hydrolysable material forms a capsule. Using encapsulated well treatment chemicals permits blending of normally incompatible compounds in the treatment fluid. As a non-limiting example, the present invention permits the transport of the hydrolysable dimer acid ester to a downhole environment by a treatment fluid having a neutral or basic pH without detrimentally impacting either the treatment fluid or the strong acid ester. A non-limiting list of mechanisms suitable for releasing the encapsulated dimer acid ester includes: a change in pH, crushing, rupture, dissolution of the membrane, diffusion and/or thermal melting of the encapsulating membrane. Following placement of the compounds downhole, the dimer acid esters are then released from the capsules and allowed to react. The controlled downhole release of the dimer acid esters will significantly improve their functionality.

In various embodiments, an amount of the hydrolysable dimer acid ester present in the treatment fluids is from about 1 wt. % to about 30 wt. %, alternatively, about 5 wt. % to about 20 wt. % alternatively about 10 wt. % to about 15 wt. % based on weight of carrier fluid used in the treatment fluid.

Catalysts

The treatment fluids of the present invention may optionally include at least one catalyst to control the rate of reaction between the hardenable acid curable resin and a hydrolysable dimer acid ester, especially in low temperature environments. The cure kinetics of this resin system are controlled by the concentration of the selected catalyst and temperature. A variety of catalysts can be used in accordance with the present embodiments. In some embodiments, the catalysts are at least one member selected from organic amine bases, inorganic bases, and mixtures thereof. In certain embodiments, the organic amine base is selected from the following group consisting of pyridine, isoquinoline, quinoline, N,N dimethylcyclohexylamine, tributylamine, tripropylamie, N-ethylmorpholine, dimethylaniline, and mixtures thereof. In exemplary embodiments, the inorganic base is selected from the following group consisting of potassium hydroxide, sodium hydroxide, ammonium hydroxide, and mixtures thereof. In one embodiment, a single resin mixture comprises of an epoxy resin, such as bisphenol A-epichlorohydrin resin used in Expedite 225 part A (available from Halliburton Energy Services, Inc. in Houston, Tex.), a hydrolyzable ester capable of generating dimerized fatty acid, and a minute amount of triethylamine acting as a catalyst or accelerator.

The catalyst may be present in an amount in the range of from and upper limit of about 5%, 4.8%, 4.6%, 4.4%, 4.2%, 4%, 3.8%, 3.6%, 3.4%, 3.2%, 396, 2.8%, and 2.6% to a lower limit of about 0.1%, 0.2%, 0.4%, 0.6%, 0.8%, 1%, 1.2%, 1.4%, 1.6%, 1.8%, 2%, 2.2%, 2.4%, and 2.6% by weight of the hardenable acid curable resin. In other embodiments, the catalyst may be present in an amount in the range of from about 1% to about 2% by weight of the hardenable acid curable resin.

Having the benefit of the present disclosure and knowing the temperature and chemistry of a subterranean formation of interest, one having ordinary skill in the art will be able to choose a catalyst and an amount thereof suitable for producing a desired coating of the proppant particulates.

Surfactants

In some embodiments, the treatment fluids include a surfactant for facilitating the contacting of the unconsolidated particulates with the reaction product of the hardenable acid curable resin, hydrolysable dimer acid ester and water in the formation. In several embodiments, the surfactant facilitates the coating of the resin on the proppant particles and causes the hardenable resin to flow to the contact points between adjacent resin coated proppant particles. In exemplary embodiments, the surfactant comprises at least one member selected from the group consisting of an ethoxylated nonyl phenol phosphate ester, mixtures of one or more cationic surfactants, a $C_{12}$-$C_{22}$ alkyl phosphonate surfactant, a mixture of one or more non-ionic surfactants, an alkyl phosphonate surfactant, and mixtures thereof. In certain embodiments, the surfactant is present in an amount of less than about 5% by weight of the treatment fluid. In other embodiments, the surfactant is present in an amount of less than about 3% by weight of the treatment fluid.

Coupling Agents

The treatment fluids of the present invention may further comprise a coupling agent. Coupling agents suitable for use in combination with the treatment fluids include without limitation a silicone-based coupling agent (e.g., a silicone-based coupling agent comprising a siloxy moiety). Suitable silicone-based coupling agents may include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; gamma-ureidopropyltriethoxysilanes; beta-(3-4-epoxy-cyclohexyl)-ethyltrimethoxysilane; vinyltrichlorosilane; vinyltris (beta-methoxyethoxy) silane; vinyltriethoxysilane; vinyltrimethoxysilane; 3-methacryloxypropyltrimethoxysilane; r-glycidoxypropylmethylidiethoxysilane; 3-aminopropyl-triethoxysilane; N-phenyl-r-aminopropyltrimethoxysilane; r-mercaptopropyltrimethoxysilane; r-chloropropyltrimethoxysilane; r-glycidoxypropylmethylidiethoxysilane; N-beta-(aminoethyl)-r-aminopropylmethyldimethoxysilane; r-aminopropyltriethoxysilane; N-[3-(trimethoxysilyl)propyl]-ethylenediamine; any derivative thereof; and any combination thereof.

In another embodiment, a single resin mixture is provided comprising of a liquid hardenable resin, a liquid hydrolyzable ester that can generate dimerized fatty acid when exposed to water, a catalyst, a silane coupling agent, a surfactant for facilitating the coating of said resin on the particulate substrate, and a liquid carrier fluid. The amount of the coupling agent may range from about 0.01 wt. % to about 5 wt. %, alternately, from about 0.1 wt. % to about 2 wt. % by weight of the hardenable acid curable resins.

Proppants

In some embodiments, the proppants may be an inert material, and may be sized (e.g., a suitable particle size distribution) based upon the characteristics of the void space to be placed in.

Materials suitable for proppant particulates may comprise any material comprising inorganic or plant-based materials suitable for use in subterranean operations. Suitable materials include, but are not limited to, sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. The mean proppant particulate size generally may range from about 2 mesh to about 400 mesh on the U.S. Sieve Series; however, in certain circumstances, other mean proppant particulate sizes may be desired and will be entirely suitable for practice of the embodiments disclosed herein. In particular embodiments, preferred mean proppant particulate size distribution ranges are one or more of 6/12, 8/16, 12/20, 16/30, 20/40, 30/50, 40/60, 40/70, or 50/70 mesh. It should be understood that the term "particulate," as used herein, includes all known shapes of materials, including substantially spherical materials; fibrous materials; polygonal materials (such as cubic materials); and any combination thereof. In certain embodiments, the particulates may be present in the first treatment fluids or single treatment fluids in an amount in the range of from an upper limit of about 30 pounds per gallon ("ppg"), 25 ppg, 20 ppg, 15 ppg, and 10 ppg to a lower limit of about 0.5 ppg, 1 ppg, 2 ppg, 4 ppg, 6 ppg, 8 ppg, and 10 ppg by volume of the polymerizable aqueous consolidation composition. In some embodiments, the sand may be graded sand that is sized based on a knowledge of the size of the lost circulation zone. The graded sand may have a particle size in the range of from about 10 to about 70 mesh, U.S. Sieve Series.

In certain embodiments, the proppants are present in an amount of less than about 5% by volume of the treatment fluid. In other embodiments, the proppants are present in an amount of less than about 3% by volume of the treatment fluid.

In some embodiments, the proppants are coated with a hardenable acid curing resin and a hydrolysable dimer acid ester before they have been placed downhole. In other embodiments, the proppants are coated after they have been placed in the subterranean formation.

Other Additives

In addition to the foregoing materials, it can also be desirable, in some embodiments, for other components to be present in the treatment fluid. Such additional components can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

The treatment fluids of the present invention may be prepared by any method suitable for a given application. For example, certain components of the treatment fluid of the present invention may be provided in a pre-blended powder or a dispersion of powder in a non-aqueous liquid, which may be combined with the carrier fluid at a subsequent time. After the preblended liquids and the carrier fluid have been combined other suitable additives may be added prior to introduction into the wellbore. As used herein, the term "substantially solids-free" refers to a fluid having less than 10% by weight of solid particulates included therein. Those of ordinary skill in the art, with the benefit of this disclosure will be able to determine other suitable methods for the preparation of the treatments fluids of the present invention.

The methods of the present invention may be employed in any subterranean treatment where a viscoelastic treatment fluid may be used. Suitable subterranean treatments may include, but are not limited to, fracturing treatments, sand control treatments (e.g., gravel packing), and other suitable treatments where a treatment fluid of the present invention may be suitable. Other potential applications of this resin system, with some minor adjustments such as modifying the dilution factor with the solvent carrier or component concentrations include: remedial proppant/gravel treatments, near-wellbore formation sand consolidation treatments for sand control, consolidating-while-drilling target intervals, and plugging-and-abandonment of wellbores in subterranean formations.

In addition to the fracturing fluid, other fluids used in servicing a wellbore may also be lost to the subterranean formation while circulating the fluids in the wellbore. In particular, the fluids may enter the subterranean formation via lost circulation zones for example, depleted zones, zones of relatively low pressure, zones having naturally occurring fractures, weak zones having fracture gradients exceeded by the hydrostatic pressure of the drilling fluid, and so forth.

In an embodiment, the consolidation treatment fluid is placed into a wellbore as a single stream and activated by downhole conditions to form a barrier that substantially seal lost circulation zones or other undesirable flowpaths.

In an embodiment, the consolidation treatment fluid may be introduced into the wellbore, the formation, or a lost circulation zone as a single pill fluid. That is, in such an embodiment, all components of the consolidation treatment fluid may be mixed and introduced into the wellbore as a single composition. In an alternative embodiment, the consolidation treatment fluid may be introduced into the wellbore, the formation, or the lost circulation zone sequentially in multiple components. As will be understood by those of ordinary skill in the art, it may be desirable or advantageous to introduce components of the consolidation treatment fluid separately and sequentially.

In still another exemplary embodiment, the separate introduction of at least two of the lost circulation treatment fluid components may be achieved by introducing the components within a single flowpath, but being separated by a spacer. Such a spacer may comprise a highly viscous fluid which substantially or entirely prevents the intermingling of the consolidation treatment fluid components while being pumped into a wellbore. Such spacers and methods of using the same are generally known to those of ordinary skill in the art.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

In various embodiments, systems configured for delivering the treatment fluids described herein to a downhole location are described. In various embodiments, the systems can comprise a pump fluidly coupled to a tubular, the tubular containing the hardenable acid curing resin and hydrolysable dimer acid ester compositions, and any additional additives disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the embodiments disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

EXAMPLE

The invention having been generally described, the following examples are given as particular embodiments of the invention and to demonstrate the practice and advantages hereof. It is understood that the examples are given by way of illustration and are not intended to limit the specification or the claims to follow in any manner.

An example of a fluid according to the invention is a mixture of bisphenol A diglycidyl ether, dimethyl dimer acid ester, and isopropanol.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:
1. A well treatment method comprising:
providing wellbore in a subterranean formation;
providing a first fluid comprising a hardenable acid curable resin and a hydrolysable dimer acid ester capable of generating a dimerized fatty acid when exposed to water;
providing a carrier fluid;
placing a first stream comprising the first fluid and the carrier fluid into a zone in the subterranean formation, said zone comprising unconsolidated particulates; and
forming consolidated particulates upon the contacting of the unconsolidated particles with the reaction product of the hardenable acid curable resin, hydrolysable dimer acid ester and water in the formation, thereby forming a cured resin, wherein the reaction product includes a dimerized fatty acid generated from the reaction of the hydrolysable dimer acid ester and water in the formation, and the dimerized fatty acid is incorporated in the cured resin that consolidates the particulates.

2. The method of claim 1, wherein the hardenable acid curable resin comprises at least one member selected from the group consisting of bisphenol A diglycidyl ether resins, butoxymethyl butyl glycidyl ether resins, bisphenol A-epichlorohydrin resins, bisphenol F resins, polyepoxide resins, novolak resins, polyester resins, urethane resins, glycidyl ether resins, other epoxide resins, and combinations thereof.

3. The method of claim 1, wherein the hardenable acid curable resin comprises a urethane resin.

4. The method of claim 1, wherein the hydrolysable dimer acid ester capable of generating a dimerized fatty acid when exposed to water comprises at least one member selected from the group consisting of polyacids, synthetic acids produced from fatty acids, maleic anhydride, acrylic acid; and any combination thereof.

5. The method of claim 4, wherein the polyacid comprises $C_{36}$ dibasic acids including at least one of dimer oligomers, trimer oligomers, tetramer oligomers, pentamer oligomers, hexamer oligomers, heptamer oligomers, octamer oligomers, nonamer oligomers, decamer oligomers, oligomers, monomer acids, and any combination thereof.

6. The method of claim 1, wherein the first stream further comprises a catalyst.

7. The method of claim 6, wherein the catalyst comprises at least one member selected from organic amine bases, inorganic bases, and mixtures thereof.

8. The method of claim 7, wherein the organic amine base is selected from the following group consisting of pyridine, isoquinoline, quinoline, N,Ndimethylcyclohexylamine, tributylamine, tripropylamie, N-ethylmorpholine, dimethylaniline, and mixtures thereof.

9. The method of claim 7, wherein the inorganic base is selected from the following group consisting of potassium hydroxide, sodium hydroxide, ammonium hydroxide, and mixtures thereof.

10. The method of claim 1, wherein the first stream further comprises a silane coupling agent.

11. The method of claim 10, wherein the silane coupling agent comprises at least one member selected from the group consisting of N-2-(aminoethyl)-3-aminopropyltrimethoxysilane, 3-glycidoxypropyltrimethoxysilane, n-beta-(aminoethyl)-gamma-aminopropyl trimethoxysilane, and combinations thereof.

12. The method of claim 1, wherein the first stream further comprises a surfactant for facilitating the contacting of the unconsolidated particulates with the reaction product.

13. The method of claim 12, wherein the surfactant comprises at least one member is selected from the group consisting of an ethoxylated nonyl phenol phosphate ester, mixtures of one or more cationic surfactants, a $C_{12}$-$C_{22}$ alkyl phosphonate surfactant, a mixture of one or more non-ionic surfactants, an alkyl phosphonate surfactant, or mixtures thereof.

14. The method of claim 1, wherein the zone comprises proppant particulates forming a proppant pack in a fracture.

15. The method of claim 14, wherein the proppant is sand.

16. The method of claim 1, wherein the forming comprises reacting the hardenable acid curable resin, hydrolysable dimer acid ester, and water in the formation, thereby forming a reaction product.

17. The method of claim 16, wherein the reaction product comprises a dimerized fatty acid incorporated into the backbone of the polyester polymer of the hardenable acid curable resin.

18. The method of claim 16, wherein the hardenable acid curable resin is a bisphenol A epoxy resin.

19. The method of claim 16, further comprising curing the reaction product to the unconsolidated particulates.

20. The method of claim 1, wherein the hydrolysable dimer acid ester is encapsulated in a hydrolysable material.

21. The method of claim 1, wherein the carrier fluid comprises a non-aqueous base fluid.

22. The method of claim 1, wherein at least one of the hardenable acid curable resin and the hydrolysable dimer acid ester is soluble in the carrier fluid.

23. A method comprising:
placing a first stream comprising a hardenable acid curable resin and a hydrolysable dimer acid ester capable of generating a dimerized fatty acid when exposed to water into a wellbore in a subterranean formation, said formation comprising unconsolidated particulates; and
forming consolidated particulates upon the contacting of the unconsolidated particles with the reaction product of the hardenable acid curing resin, hydrolysable dimer acid ester and water in the formation, thereby forming a cured resin, wherein the reaction product includes a dimerized fatty acid generated from the reaction of the hydrolysable dimer acid ester and water in the formation, and the dimerized fatty acid is incorporated in the cured resin that consolidates the particulates.

24. A method comprising:
providing a wellbore in a subterranean formation;
providing a first fluid comprising a hardenable acid curable resin and a hydrolysable dimer acid ester capable of generating a dimerized fatty acid;
providing proppant particulates;
coating the proppant particulates with the first fluid;
providing a second stream comprising an aqueous base fluid;
creating at least one fracture in said subterranean formation;
placing a first stream comprising the coated proppant particulates and the second stream into the subterranean and into at least one fracture therein;
wherein the proppant particulates form a proppant pack in the at least one fracture; and
forming consolidated proppant particulates upon the curing of the coated proppant particulates in the proppant pack upon hydrolyzing of at least a portion of said dimer acid ester, thereby forming a cured resin, wherein the reaction product includes a dimerized fatty acid generated from the reaction of the hydrolysable dimer acid ester and water in the formation, and the dimerized fatty acid is incorporated in the cured resin that consolidates the particulates.

25. A well treatment system comprising:
a well treatment apparatus configured to:
form or provide a first stream comprising a hardenable acid curable resin and a hydrolysable dimer acid ester capable of generating a dimerized fatty acid when exposed to water;
place the first stream into a zone in a subterranean formation, said zone comprising unconsolidated particulates; and
form consolidated particulates upon the contacting of the unconsolidated particles with the reaction product of the hardenable acid curable resin, hydrolysable dimer acid ester and water in the formation, thereby forming a cured resin, wherein the reaction product includes a dimerized fatty acid generated from the reaction of the hydrolysable dimer acid ester and water in the formation, and the dimerized fatty acid is incorporated in the cured resin that consolidates the particulates.

* * * * *